United States Patent [19]

Mautner et al.

[11] Patent Number: 5,683,671

[45] Date of Patent: Nov. 4, 1997

[54] PROCESS FOR PURIFYING SULFURIC ACID

[75] Inventors: Konrad Mautner, Burghausen; Gerhard Nagy, Ranshofen; Martin Kankowsky, Kirchdorf, all of Germany

[73] Assignee: Wacker-Chemie GmbH, Munich, Germany

[21] Appl. No.: 762,479

[22] Filed: Dec. 9, 1996

[30] Foreign Application Priority Data

Jan. 11, 1996 [DE] Germany ............ 196 00 810.7

[51] Int. Cl.$^6$ ............ C01B 17/74; C01B 17/90
[52] U.S. Cl. ............ 423/528; 423/531; 423/525
[58] Field of Search ............ 423/522, 525, 423/529, 531, 528; 422/160, 161

[56] References Cited

U.S. PATENT DOCUMENTS

| | | | |
|---|---|---|---|
| 2,255,421 | 9/1941 | Ciroll et al. | 423/531 |
| 2,345,506 | 3/1944 | Slotterbeck | 423/528 |
| 3,979,465 | 9/1976 | Strehlke et al. | 423/531 |
| 4,935,220 | 6/1990 | Schneider et al. | 423/488 |
| 5,275,701 | 1/1994 | Mazzafro et al. | 423/531 |

FOREIGN PATENT DOCUMENTS

| | | | |
|---|---|---|---|
| 0084674 | 8/1983 | European Pat. Off. | |
| 887959 | 11/1943 | France. | |
| 2516173 | 6/1975 | Germany | 423/531 |
| 2503610 | 8/1976 | Germany | 423/531 |
| 3151691 | 7/1983 | Germany | 423/531 |
| 47-26592 | 7/1972 | Japan | 423/531 |
| 800127 | 1/1981 | U.S.S.R. | 423/531 |
| 508302 | 6/1939 | United Kingdom | 423/531 |
| 2110681 | 6/1983 | United Kingdom. | |

OTHER PUBLICATIONS

Schott Engineering 1987 from Schott Engineering GmbH, Mainz, pp. 12–17 "A Process for the concentration and purification of waste sulfuric acid is described in which oxidizing agents are added in a problem-specific manner to the waste acid".

Ullmann's Encyclopedia of Industrial Chemistry, 4th Edition, vol. 21, pp. 117 ff., Verlag Chemie Weinheim (1982) Suitable processes for concentrating dilute Sulfuric acids are described.

Derwent Abstract An 83–706308[28] for EP–0084674 A.

Database WPI Section Ch, Week 8538, Derwent Publications Ltd. AN 85–234939.

Database WPI, Section Ch, Class C 04, AN73–55105u.

*Primary Examiner*—Gary P. Straub
*Attorney, Agent, or Firm*—Martin Connaughton

[57] ABSTRACT

In the process, used sulfuric acid which contains, as minor constituents, methylsulfuric acid, dimethyl ether, methanol, aliphatic and olefinic hydrocarbons, chlorinated hydrocarbons and oligomeric siloxanes, in a first step;

(1) used sulfuric acid is diluted by introducing steam and optionally by adding liquid water to a concentration of at most 55% by weight sulfuric acid and is heated to boiling at a maximum of 135° C. and in a second step;

(2) the sulfuric acid from the first step is reacted with an oxidizing agent at a temperature of from 20° C. to 130° C.

7 Claims, No Drawings

PROCESS FOR PURIFYING SULFURIC ACID

FIELD OF INVENTION

The present invention relates to a process for purifying used sulfuric acid which contains, as minor constituents, methylsulfuric acid, dimethyl ether, methanol, aliphatic and olefinic hydrocarbons, chlorinated hydrocarbons and oligomeric siloxanes.

BACKGROUND OF INVENTION

Chloromethane is used in the direct synthesis of methylchlorosilanes. The chloromethane required is generally prepared from methanol and hydrogen chloride, water and, in small amounts, dimethyl ether being formed as by-products. Chloromethane for preparing methylchlorosilanes must be carefully dried and freed from dimethyl ether.

The hydrogen chloride used for the preparation of chloromethane originates from hydrolysis reactions of methylchlorosilanes. Therefore, in the prepared chloromethane, minor constituents of methylchlorosilanes, such as aliphatic and olefinic hydrocarbons and chlorinated hydrocarbons, may also be found. If the hydrogen chloride from hydrolysis reactions of methylchlorosilanes is used directly without intermediate purification in the production of chloromethane, oligomeric siloxanes in accordance with the vapor pressure can additionally pass into the product.

Chloromethane can be freed from the above mentioned impurities by scrubbing with concentrated sulfuric acid. In addition to water and dimethyl ether, the remaining minor constituents, particularly olefins and oligomeric siloxanes, are absorbed in the sulfuric acid owing to their Lewis base properties. The used sulfuric acid is approximately 75% strength by weight and must be ejected, when its absorption capacity for dimethyl ether is exhausted.

DE-A-25 03 610 describes a process for purifying sulfuric acid contaminated with methylsulfuric acid. For this purpose, used sulfuric acid originating from the purification of chloromethane is diluted with 10% to 25% by weight of water, based on the sulfuric acid content. Steam is introduced, at a temperature of 170° to 180° C. The methylsulfuric acid content is hydrolyzed to methanol and sulfuric acid and methanol is distilled off.

The process of DE-A-25 03 610 is not applicable to sulfuric acid which, in addition to methylsulfuric acid, dimethyl ether and methanol further contains additional impurities described above, such as olefins and oligomeric siloxanes since cracking processes occur owing to the high temperature. The carbon formed is solid like coke and leads to rapid blocking of apparatus components. The high acid concentration causes a slight oxidation of organic contents. This in turn releases sulfur dioxide, which produces an additional off-gas pollution.

In the booklet "Schott Engineering, 1987" from Schott Engineering GmbH, Mainz, pages 12 to 17, a process for the concentration and purification of waste sulfuric acid is described, in which oxidizing agents are added in a problem-specific manner to the waste acid.

The oxidation of organic impurities described in Schott is expensive at high pollution rates, since large amounts of oxidizing agent have to be added. The oxidation of organosilicon compounds leads to colloidally distributed silica. Filtration, owing to the aggressive medium and owing to the small particle size, represents a relatively great problem. Furthermore, contacting relatively large amounts of an oxidizing agent with the sulfuric acid containing dimethyl ether comprises a considerable safety hazard.

The addition of oxidizing agents following the process described in DE-A-25 03 610 is not expedient, since the coarse coke particles are oxidized slowly and only with difficulty, owing to the small surface area in comparison to the volume.

SUMMARY OF INVENTION

The object of the present invention is to provide a process for purifying used sulfuric acid, where the above mentioned minor constituents are effectively removed and only small amounts of oxidizing agents are consumed.

The present invention relates to a process for purifying used sulfuric acid which contains, as minor constituents, methylsulfuric acid, dimethyl ether, methanol, aliphatic and olefinic hydrocarbons, chlorinated hydrocarbons and oligomeric siloxanes, where in a first step;
  (1) used sulfuric acid is diluted by introducing steam and optionally by adding liquid water to a concentration of at most 55% by weight of sulfuric acid and is heated to boiling at a maximum of 135° C. and in a second step,
  (2) the sulfuric acid from the first step is reacted with an oxidizing agent at a temperature of from 20° C. to 130° C.

In the first purification step, the used sulfuric acid is diluted with liquid water at ambient temperature to a concentration whose boiling temperature at 0.1 MPa is a maximum of 135° C., preferably a maximum of 130° C. and is then treated with steam.

By means of the dilution with liquid water, the absorbed dimethyl ether is released from the used sulfuric acid and outgases.

In the first step, the used sulfuric acid is not diluted to below 45% by weight of sulfuric acid, otherwise too much water must be removed in a later concentration.

The heat of dilution released, and the injected steam, heat the acid to a boiling temperature of 130° C. corresponding to the boiling point of a 55% strength by weight sulfuric acid at 0.1 MPa.

The steam, according to the steam-distillation principle, reduces the vapor pressure of the minor constituents which are discharged from the acid together with the steam and can then be fed to appropriate disposal.

In the steam treatment, reduced pressure can also be used.

Steam having a temperature of 120° to 140° C. is used. At temperatures above 135° C., the coking of the minor constituents occurs so rapidly that uncontrolled coke precipitation occurs.

The amount of steam used is 10% to 200% by weight, preferably 20% to 60% by weight, based on the amount of sulfuric acid in the used sulfuric acid.

By introducing steam into the boiling dilute sulfuric acid, the oligomeric siloxanes are removed and further minor constituents, such as methanol, aliphatic and olefinic hydrocarbons and chlorinated hydrocarbons, are partially removed. The oligomeric siloxanes are principally cyclodimethylsiloxanes, such as hexamethylcyclotrisiloxane, octamethylcyclotetrasiloxane, decamethylcyclopentasiloxane and dodecamethylcyclohexasiloxane and linear siloxanes, such as hexamethyldisiloxane, octamethyltrisiloxane, decamethyltetrasiloxane and dodecamethylpentasiloxane and α-ω siloxane-diols, such as tetramethyldisiloxanediol, hexamethyltrisiloxanediol and octamethyltetrasiloxanediol. The nonchlorinated or chlorinated hydrocarbons are alkanes and olefins having 6 to 7 carbon atoms.

The COD (Chemical Oxygen Demand, ie. oxygen consumption for complete oxidation in mg/liter) can be considered as an index of the organic pollution of the used sulfuric acid. The used sulfuric acid originating from the chloromethane scrubbing process customarily has a COD of at least 100,000 mg/liter. After the first purification step, the acid has a COD of at most 10,000 mg/liter, but is generally reddish-brown.

If the used sulfuric acid is insufficiently diluted, the minor constituents can only be discharged insufficiently, since their energy of interaction with the sulfuric acid is still too high. A consequence of this is an increased oxidizing agent consumption in the subsequent step, and silica pollution of the sulfuric acid. The silica is formed by oxidation from the oligomeric siloxanes. If this acid is treated as described in DE-A-25 03 610, methanol and dimethyl ether are virtually completely removed. Olefins and siloxanes are removed only inadequately or not at all. The COD decreases to values of 20,000–50,000 mg/liter. Coke-like cracking products form, which can block all plant components and which cannot be removed chemically but may only be removed mechanically. Filtration of the acid would seem to be an obvious alternative, however filtration of approximately 65%–70% strength sulfuric acid at 170° C. makes extreme demands of the materials.

In a second purification step, the residual pollution of oxidizable components is removed by adding an oxidizing agent. Nitric acid, ozone, chlorine, chlorine dioxide or hydrogen peroxide can be used as an oxidizing agent. When nitric acid is used, aqueous $HNO_3$ having a concentration of 50% to 70% by weight is used. When ozone is used, the oxidation rate can be increased by UV radiation. Hydrogen peroxide is used as a 20% to 50% strength by weight solution in water, preferably 30% to 35% strength by weight.

The oxidation proceeds at 80° to 130° C. and at pressures of 0.03 to 0.3 MPa, preferably 0.09 to 0.2 MPa. The amount of oxidizing agent added is calculated from the COD value determined. At least the stoichiometric amount of oxidizing agent is added. Up to 200% of the calculated amount of the oxidizing agent can be added. Excess oxidizing agent is added if the oxidizing agent has a tendency toward thermal and/or catalytic auto decomposition. Thus hydrogen peroxide decomposes thermally to form water and oxygen. Heavy metal ions, which can be present in the acid as impurities, catalyze this auto decomposition.

The reaction time of this second step is at least 15 minutes, preferably at least 30 minutes.

After the second purification step, a colorless water-clear sulfuric acid results, in which silicon and hydrocarbons are not detectable.

The sulfuric acid obtained in the second step is, in a third step, brought back to a concentration at which reuse in the chloromethane purification is possible. Preferably, the sulfuric acid is concentrated to 90% to 98% by weight.

Suitable processes for concentrating dilute sulfuric acids are described, for example, in "Ullmanns Encyklopädie der technischen Chemie", [Ullmans Encyclopedia of Industrial Chemistry]", 4th Edition, Volume 21, pp. 117ff, Verlag Chemie, Weinheim (1982).

All the individual steps can be carried out batchwise. However, the work-up steps preferably proceed continuously.

In the following examples, a used sulfuric acid having the following composition is used:

| Sulfuric acid | 80% by weight |
|---|---|
| Water | 15% by weight |
| Dimethyl ether | 4.5% by weight |
| Dimethylcyclosiloxane | 0.2% by weight |
| $C_4$—$C_8$-hydrocarbons | 0.3% by weight |
| The COD is greater than | 200,000 mg/liter. |

EXAMPLE 1

(analogous to DE-A-25 03 610; not according to the invention).

The used sulfuric acid is diluted with 10% by weight of water and fed from the top at 1 liter/hour into a glass column (length 1 m, diameter 50 mm) packed with glass Raschig rings. Steam is injected from the bottom at a temperature of 138° C. in an amount such that the temperature of the effluent acid is 170° C. The concentration of the acid is 68% by weight. It is colored deep black by the cracking products and coke particles. The COD is 20,000 mg/l. $HNO_3$ in the amount of 100 g/l (corresponding to 1.2 times the stoichiometric amount) are added to the acid. After 30 min. at 140° C., the acid is concentrated at 5 kPa and 180° C. A black, solids-containing (coke particles and silica) sulfuric acid results having a concentration of 91.2% by weight.

EXAMPLE 2

The used sulfuric acid at room temperature is diluted with water to a concentration of 55% by weight and fed at 1 l/h from the top into a glass column (length 1 m, diameter 50 mm) packed with glass Raschig rings. Steam is injected from the bottom at a temperature of 138° C. in an amount such that the temperature of the effluent acid is 130° C. The concentration of the acid is 51% by weight. It is colored reddish-brown and contains no solid particles. The COD is 2000 mg/l. $H_2O_2$ in the amount of 20 g/l (corresponding to 1.6 times the stoichiometric amount) are added to the acid. After 30 min. at 90° C., the acid is concentrated at 5 kPa and 180° C. A colorless, water-clear sulfuric acid results having a concentration of 90.4% by weight, in which silicon and hydrocarbons are not detectable.

What is claimed is:

1. A process for purifying used sulfuric acid which contains, as minor constituents, methylsulfuric acid, dimethyl ether, methanol, aliphatic and olefinic hydrocarbons, chlorinated hydrocarbons and oligomeric siloxanes, where in a first step;

(1) diluting the used sulfuric acid to a concentration of at most 55% by weight with steam and optionally water, in a second step;

(2) heating to boiling at a maximum temperature of 135° C. with the steam from step 1 to remove the minor constituents; and in a third step;

(3) reacting the acid from step 2 with an oxidizing agent at a temperature of from 20° C. to 130° C.

2. The process as claimed in claim 1, where, in the first step, steam is used at a temperature of 120° to 140° C.

3. The process as claimed in claim 1, wherein the oxidizing agent in the second step is selected from nitric acid, ozone, chlorine, chlorine dioxide and hydrogen peroxide.

4. The process as claimed in claim 1, wherein the oxidation of the second step is carried out at from 80° C. to 130° C.

5. The process as claimed in claim 1, where the concentration of used sulfuric acid in the dilution is from 45% to 55% by weight of the dilution.

6. The process as claimed in claim 1, where in step (2), removal of minor constituents is carried out by steam stripping where the steam is at a temperature of from 120° C. to 140° C.

7. The process as claimed in claim 1, where in the process of steps (1) to (3) are carried out in a continuous manner.

* * * * *